E. TOBIESSEN.
ELECTRICAL CONTROLLING SYSTEM.
APPLICATION FILED NOV. 30, 1910.
1,164,035.
Patented Dec. 14, 1915.
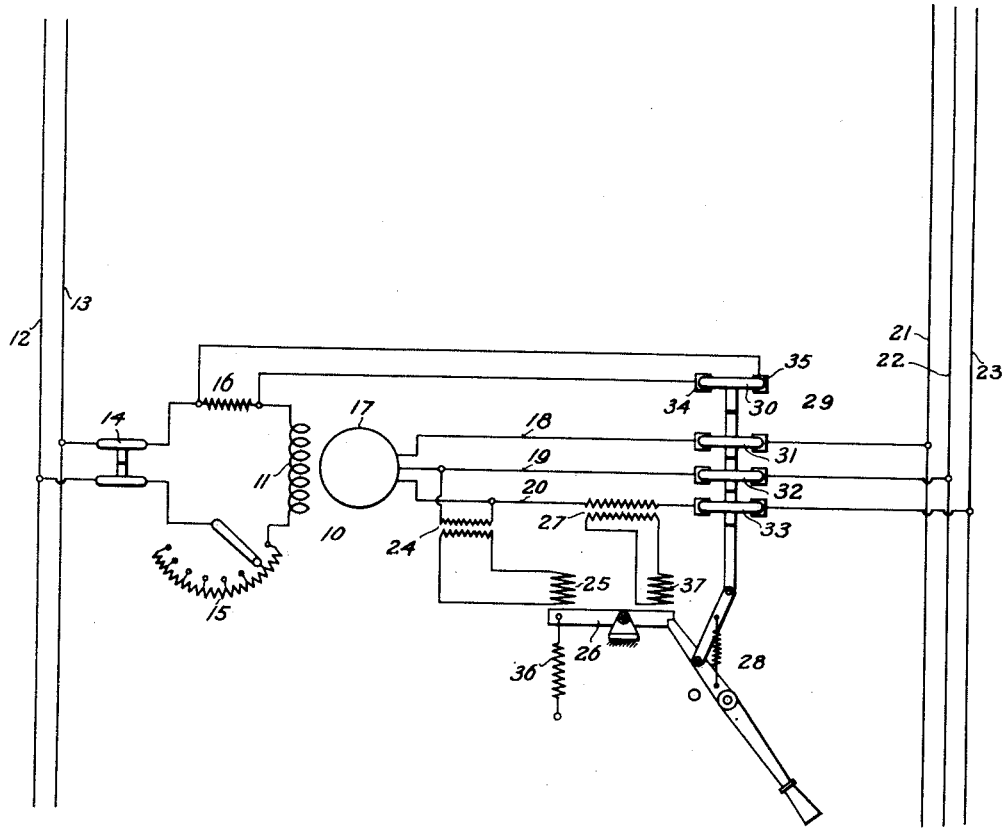

UNITED STATES PATENT OFFICE.

EMANUEL TOBIESSEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

ELECTRICAL CONTROLLING SYSTEM.

1,164,035.        Specification of Letters Patent.        Patented Dec. 14, 1915.

Application filed November 30, 1910. Serial No. 594,819.

*To all whom it may concern:*

Be it known that I, EMANUEL TOBIESSEN, a citizen of the United States, residing at Milwaukee, in the county of Milwaukee and State of Wisconsin, have invented certain new and useful Improvements in Electrical Controlling Systems, of which the following is a full, clear, and exact specification.

This invention relates to systems of control for dynamo-electric machines, and particularly to means for preventing abnormal heating of such machines under any and all conditions.

In the operation of dynamo-electric machines, such machines are usually maintained in a cool and safe operating condition by the action of the rotating members which are usually provided with fans or other means for setting up a circulating air for cooling purposes. As is well known, the heat, which is developed in electric machines, is directly due to current passing through the windings. When machines are in operation the heating effect caused by the electric currents is overcome, or at least partially so, by the developed circulation of cooling air produced by the rotor. In self-exciting machines, electric current ceases to flow in the winding or windings when the rotary member is brought to rest, and it is not necessary that a forced or natural circulation of cooling fluid be continued. But in the case of separately-excited machines or machines in which the field excitation is independent of any movement of the rotor, as in the case of synchronous motors where the motor is rendered mechanically inoperative by interrupting the circuit of the alternating current member, electric currents flow through the field windings after the rotor comes to rest unless the field circuit is broken manually. It is thus seen that when the rotating member of separately-excited and similar machines is caused to come to rest circulation of cooling fluid normally developed by the rotation of the rotor ceases. But at the same time if the exciting current is not shut off, the winding or windings will become excessively heated and possibly burn out rendering the machine absolutely useless.

It is the object of my invention to provide means in connection with separately excited and similar dynamo-electric machines to maintain such machines in a cool and safe state under any and all conditions.

The various novel features of my invention will be described in the specification and particularly set forth in the appended claims.

The invention is illustrated in the accompanying diagram.

While my invention is illustrated in connection with a three-phase synchronous motor, I do not intend to limit myself to that particular type of translating device or any one particular system wherein any particular type of separately excited or similar machine is used.

The dynamo-electric machine 10 in this particular system of control is provided with a separately-excited field winding 11, which is connected to direct current mains 12 and 13 through a switch 14. Also located in this separately excited field circuit is a rheostat 15 for the purpose of regulating the strength of the field. Another resistance 16, normally short-circuited from the separately excited field circuit, is adapted to be cut into said circuit upon the occurrence of certain predetermined conditions to be referred to hereinafter. This machine is provided with a rotor 17 illustrated as having a three-phase winding. Leads 18, 19, and 20 respectively are adapted to connect the three-phase winding to the mains 21, 22, and 23, of a supply source of alternating current. Connected across the leads 19 and 20 is a voltage transformer 24 which is connected to a no voltage magnet 25 adapted under normal conditions to draw and retain a pivoted lever 26 in a certain predetermined position. Located in the lead 20 is one winding of a series transformer 27 connected to an overload magnet 37 for attracting said pivotally mounted lever 26 under certain predetermined electrical conditions.

Under normal operating conditions the lever 26 is held in the position indicated in the diagram by the action of the no-voltage magnet 25. A spring-pressed collapsible member 28, which is connected to and adapted to operate a switch 29 having bridging contacts 30, 31, 32, and 33, is held in circuit closing position by the lever 26. The bridging contact 30 normally engages its coöperating contacts 34 and 35 for the purpose of short-circuiting the resistance 16 out of the circuit of the separately-excited field 11. The bridging contacts 31, 32, and 33 are used for the purpose of making and breaking the connections of the three-phase rotor winding with the source of alternating current supply.

It is customary to provide rotating members, such as 17, with fans or other means for creating a circulation of air for cooling the various parts of dynamo-electric machines. Under ordinary circumstances no particular ventilating or cooling difficulties are encountered in connection with self-exciting machines. Generally in these machines current ceases to flow in the windings thereof when the rotors of the machine come to rest, and therefore it is not necessary that a cooling fluid be forced through the machines when this state of rest is reached. But in the case of separately excited or similar dynamo-electric machines, current passes through the exciting field independently of the rotation of such machines. It is apparent therefore, that while the heating effect in self-exciting dynamo-electric machines may be very readily overcome, such is not the case, unless especial attention is paid to shutting off the continual flow of exciting current, in a separately-excited or similar machine which would become excessively heated and endanger the machine.

In order to prevent any undesirable effects or results occasioned by excessive heating due to the continual flow of exciting currents in a separately excited field when the ventilating or cooling source is excluded from service, means has been provided whereby, upon any predetermined condition causing the rotating member to come to rest, the resistance 16 is automatically cut into the field circuit for the purpose of cutting down the exciting current and the heating effect occasioned thereby. Any desirable effective resistance may be used for this purpose.

As here shown I have provided automatically operated means whereby the resistance 16 may be cut into the field circuit under abnormal and other operating conditions. When the machine is in normal operation the lever 26 is held up and retained in the position shown in the diagram by the no-voltage magnet 25 against the tension of a spring 36, and the collapsible member 28 retains the switch in circuit closing position by engaging the lever 26. If, for any reason, the voltage impressed upon the three-phase winding of the machine should fail the magnet 25 would become deënergized and the spring 36 would draw lever 26 out of engagement with the collapsible member 28, causing the switch 29 to break circuit connections and insert the resistance 16 in the circuit of the separately excited field of the machine. In this way the current in said field would be decreased to any desired amount depending upon the effective value of the resistance inserted. It is thus seen that the heating effect of the separately-excited field would be materially decreased, maintaining the machine in a cool and safe condition. Again, if for any reason there should be an overload on the line the overload magnet 37 would draw up its end of the lever 26 causing the member 28 to collapse and break the connections of the switch 29 thereby inserting the resistance 16 with the same results referred to above.

By means of my invention therefore, these dynamo-electric machines hereinbefore referred to are not only maintained safe and cool when they are in effective operation, but also when the rotor is at rest and current is being fed into the fields of separately excited and similar translating devices.

It is evident that other arrangements and modifications of my invention may be made for effecting the same result, and I intend in my claims to cover all such arrangements and modifications which do not involve a departure from the spirit and scope of my invention.

What I claim as new is:

1. In combination, a dynamo-electric machine having a stationary field excited from a source external of said machine and independently of the armature of said machine, said machine being of a type wherein the armature is rendered mechanically inoperative through interruption of the circuit thereof, and switch means effective to decrease the current in the circuit of the field whenever the armature circuit is interrupted.

2. In combination, a dynamo-electric machine having a separately excited stationary field element, said machine being of a type wherein the armature is rendered mechanically inoperative through the interruption of the circuit thereof, and switch means comprising simultaneously operative elements respectively adapted to cause the opening of the circuit of the armature and a decrease in the current in the field circuit.

3. In combination, a dynamo-electric machine having a rotatable element provided with a winding, and a stationary element provided with a winding, and connections for supplying said latter winding with energy other than through the winding of said rotatable element, said machine being of a type wherein the machine is rendered mechanically inoperative through the interruption of the circuit of the winding of said rotatable element, and means rendered operative on any interruption of the circuit of the winding of said rotatable element to cause a decrease in the current in the circuit of the winding of said stationary element.

4. In combination, a dynamo-electric machine having a rotatable element provided with a winding, a stationary element provided with a winding connected for excitation independently of the winding of said rotatable element, means operative during the mechanical operation of said rotatable element to cause discontinuance of such operation, and means rendered operative through operation of said first mentioned means to cause a decrease in the current of the circuit of the winding of said stationary element.

5. In combination, a dynamo-electric machine having a rotatable element provided with a winding, a stationary element provided with a winding connected for excitation independently of the winding of said rotatable element, and control means for said machine comprising devices associated with each other and respectively adapted to cause the discontinuance of mechanical operation of said rotatable element and a decrease in the current in the circuit of the winding of said stationary element.

Milwaukee, Wis., Nov. 25, 1910.

In testimony whereof I affix my signature, in the presence of two witnesses.

EMANUEL TOBIESSEN.

Witnesses:
CHAS. L. BYRON,
ROB. E. STOLL.